June 2, 1931. J. FISCHER 1,808,457
AUTOMATIC INCLINATION BALANCE
Filed Feb. 9, 1929 2 Sheets-Sheet 2
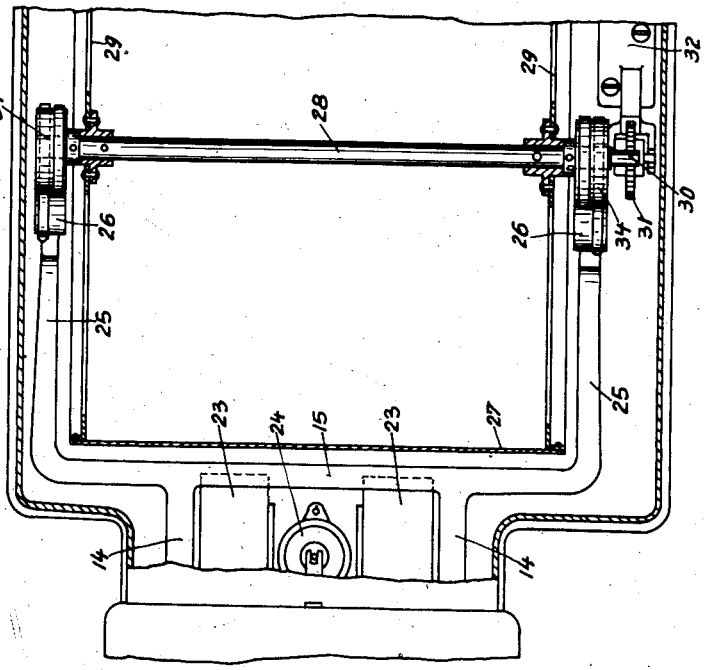
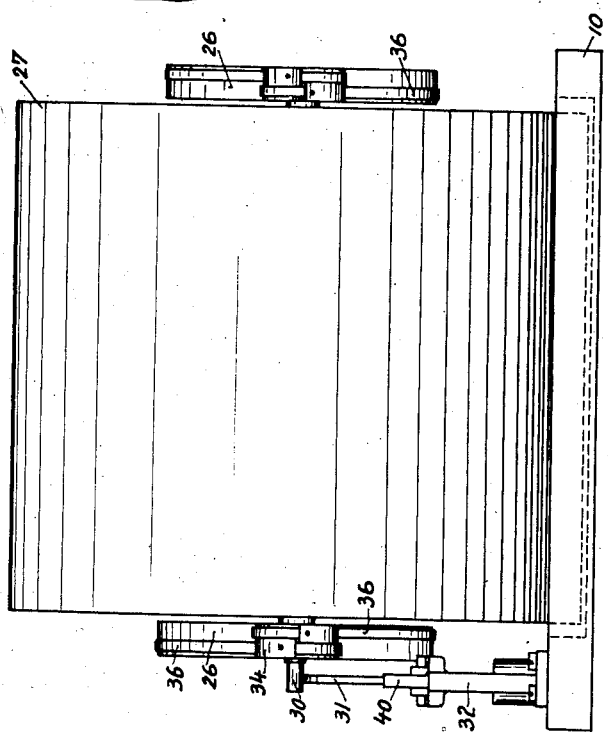
Inventor
John Fischer Patented June 2, 1931

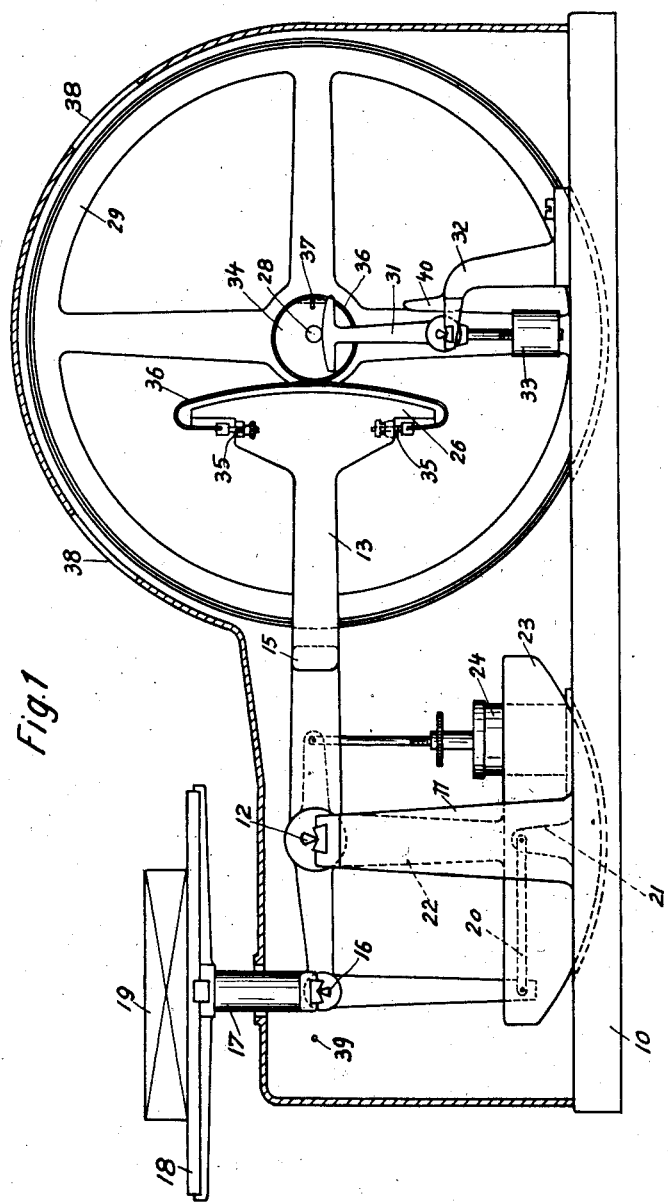

1,808,457

UNITED STATES PATENT OFFICE

JOHANN FISCHER, OF BERLIN-CHARLOTTENBURG, GERMANY, ASSIGNOR TO THE FIRM ADE FABRIK AUTOMATISCHER SCHNELLWAAGEN G. M. B. H., OF BERLIN-REINICKENDORF, GERMANY

AUTOMATIC INCLINATION BALANCE

Application filed February 9, 1929, Serial No. 338,849, and in Germany February 14, 1928.

My invention relates to improvements in automatic inclination balances, and more particularly to such a type of a balance in which the weigh-beam is provided with a segment which is kept in non-slipping driving engagement with a rotatable scale to give indication of the amount of displacement of the weigh-beam, thereby indicating the weight.

An object of my invention is an improved support for the rotatable indicator offering a minimum of resistance and being of extremely simple construction and high efficiency.

Another object of my invention is such a connection between the weigh-beam and the rotatable indicator as will result in a scale having a uniform pitch over its entire length. This connection is preferably so constructed that the distance of the axis of the rotatable indicator from the axis of the weigh-beam will remain constant regardless of the displacement of the weigh-beam, whereby the axle of the indicator is prevented from moving to and fro coincidentally with oscillations of the weigh-beam.

Other objects of my invention will appear from the description following hereinafter, and the features of novelty will be pointed out in the claims.

A preferred embodiment of my invention is shown in the accompanying drawings, in which Fig. 1 is an elevation of the balance having a load imposed on it equalling about half of the total capacity of the balance, the casing being shown in section;

Fig. 2 is an end-view seen from the right of Fig. 1;

Fig. 3 is a partial plan-view, the casing and the indicator drum being shown in section.

The base plate 10 of the balance carries two lateral standards 11 supporting, by means of knife edges 12, the weigh-beam 13 which is in the form of a frame constituted by two lateral longitudinal rails 14 suitably interconnected by transverse rails such as indicated at 15. The short arm of the weigh-beam 13 which is directed towards the left carries by means of knife edges 16 the supporting stem 17 with the support or plate 18 for the goods to be weighed. In Fig. 1 a package 19 is imposed thereon the weight of which equals about half of the capacity of the balance. The lower end of stem 17 is connected by a suitable link 20, to a lug 21 of the base plate and is, thus, properly guided.

From the central part of the weigh-beam 13 arms 22 extend downwardly and carry at their ends counterweights 23 which are spaced from each other to accommodate between them a dash-pot 24, the piston of which is suitably connected to the weigh-beam, as shown in the drawings.

Thus, the weigh-beam with its counterweights constitutes a pendulum which is displaced in response to the weight of goods imposed on plate 18. For the purpose of translating such displacement into a corresponding turn of the indicator, the weigh-beam 13 carries, at the ends of two off-set beam 13 carries, at the ends of its rails 14, segments 26. continuations 25 of its rails 14, segments 26. The weight-indicator which, in the embodiment shown, is in the form of a drum 27 having a peripheral scale, is in driving connection with the segments 26 to be turned thereby through the intermediary of means that will be described hereinafter.

The axle 28 of the drum which carries the peripheral part thereof by means of suitable spiders 29 projects at one side beyond the drum to form a pivot 30. This pivot is supported by the rolling face of a suitably profiled supporting lever 31 antifrictionally mounted on a standard 32. A counterweight 33 serves to balance the lever 31, the rolling face being concentric to the bearing point. An abutment 40 serves to limit its oscillations.

Fixed on axle 28 are two cams 34 which are disposed in front of the segments 26 and are held in driving engagement therewith, suitable means being provided to prevent any relative slip.

These means preferably comprise steel bands 36, two for each segment and arranged in such a manner that one band winds upon the cam 34 while the other band simultaneously unwinds from the same and is wound upon the face of the registering segment as will easily be understood from the showing. The bands may be tightened by means of screws 35 to ensure intimate contact between them and the rolling face of the segment. Each band has its one end connected to one of these screws and its other end to the cam as indicated at 37.

The periphery of the drum 27 is provided with suitable weight and/or price scales visible through windows 38 of the casing. The windows may be formed with a suitable stationary hand or other indicator, not shown. In adjusting the bands 36 by means of screws 35 care must be taken to ensure a proper and true parallelism of axle 28 with the axis of oscillation of the weigh-beam. The profile of the cams 34 is so designed as to eliminate the well known disadvantage of responding to successive equal increases of the weight by displacing or shifting the indicator through unequal angles. This disadvantage which is characteristic of inclination balances owing to the effect of the pendulum, involves the necessity of providing scales on the indicator which have a non-uniform pitch. With the arrangement of a suitably profiled cam, however, I attain that the drum is turned through equal successive angles in response to successive equal increases of the weight so that, obviously, a uniform scale may be used on the periphery of the drum. Particular advantages flow from this arrangement in case the indicator is coupled with or replaced by an accounting mechanism.

The principles on which the profile of the cams is to be designed are well known to anybody skilled in the art. For the clear understanding of my invention it will suffice to mention that the radii effective at any position to translate the shifting motion of the segments into rotating motion of the axle 28 must continually increase from their initial position to their intermediary position and, then, decrease by the same amounts toward the end-position. The alteration of the effective radii corresponds to a sinus-curve similar to the alteration of the torque exerted by the pendulum of the inclination balance. As the alteration of the radii has an effect which counteracts and compensates for the change of the pendulum torque, the aforementioned result is obtained, viz a uniform pitch of the scale on drum 27. In the embodiment shown, the cam has a true circular profile thus forming what is ordinarily termed an eccentric.

In balances prior to my invention the rolling face of the segments was concentric to the axis of the weigh-beam constituted in the embodiment by the knife edges 12. If the same arrangement were chosen in the instant case the consequence would be a horizontal to-and-fro motion of axle 28 the stroke of which would amount to twice the eccentricity of the cams 34. Such motion, however, would be objectionable inasmuch as it would cause a displacement of the scale relative to the windows 38 and would give rise to misreadings unless special provisions were made. To avoid such to-and-fro motion I have given the segments 26 a curvature the center of which is situated at 39 instead of at 12. Thus, the various points on the rolling face of the segment have a different distance from the axis of oscillation 12, the arrangement being such that the distances continually increase from the one measured in the plane of the weigh-beam 13 towards those extending to the ends of the rolling face. Hence, the total of the radii of cam 34 and of the segment 26 cooperating at any time is constant regardless of the amount of the displacement of the weigh-beam, to-and-fro motion of the axle 28 being avoided thereby.

A feature of particular significance resides in the fact that one single supporting lever, such as 31, serves to support axle 28. In similar constructions prior to my invention a plurality of such levers was deemed necessary to keep the drum-axle horizontal. If a non-slipping engagement is provided for between the segment and the indicator drum, however, I have found that a single supporting lever constitutes a sufficient support therefor and offers the considerable advantage of substantially reduced frictional resistance.

What I claim is:—

1. An automatic inclination balance comprising a weigh-beam, a support for the goods to be weighed carried by the one arm of said beam, a segment attached to the other arm thereof, a counterweight suspending from said beam, a rotatable drum having a uniform scale on the face thereof, an eccentric fixed on the axle of said drum in engagement with said segment to be rotated thereby, the radius of said segment being so dimensioned in excess to the length of said arm carrying it that the distance of the axis of said drum from the axis of oscillation of said weigh-beam remains unaffected by oscillations of said weigh-beam regardless of the turns of said eccentric whereby to and fro horizontal motion of the axle of the drum is substantially eliminated and whereby the drum is turned to equal successive angles in response to successive equal increases of weights deposited upon the aforesaid support for goods.

2. An automatic inclination balance comprising a weigh-beam swingable about an axis, a support for the goods to be weighed carried by one arm thereof, a segment attached to the other arm thereof, a counterweight suspending from said arm, a rotatable drum having an axle disposed in front of said segment and parallel to said axis, one single supporting lever provided with a rolling face supporting said axle, a cam fixed on said axle in engagement with the curved face of said segment to be rotated thereby, when said weigh-beam is displaced, and bands wound upon said cam and said segment to secure non-slipping engagement of the same and to keep said axle from tilting about its supporting lever.

3. An automatic inclination balance comprising, in combination, a weigh-beam oscillatably mounted on a substantially horizontal axis and having two arms, a weighted pendulum secured to said beam, a plate support carried by one arm of said weigh-beam for holding the goods to be weighed, and a segment having a cam face secured to the other arm, both said plate support and said segment being cooperatively connected to said pendulum for common displacement in response to the weight of said goods, a rotatable drum having a uniform scale on the face thereof and having an axle disposed in front of said segment and parallel to the horizontal axis of the weigh-beam, one single supporting lever extending from said axle, a rolling face supporting said lever and said axle, a cam fixed on said axle in engagement with the curved face of said segment to be rotated thereby, when said weigh-beam is displaced, and bands wound upon said cam and said segment to secure non-slipping engagement of the same and to keep said axle from tilting about its supporting lever, whereby said rotatable drum is turned through equal successive angles in response to successive equal increases of the weight placed on the plate support.

4. An automatic inclination balance comprising a weigh-beam, a plate support for the goods to be weighed carried by the one arm of said beam, a segment attached to the other arm thereof, a counterweight suspending from said beam, a rotatable drum having a uniform scale on the peripheral face thereof and mounted in such a manner as to be practically incapable of to and fro horizontal motion, an eccentric cam cylinder fixed on the axle of said drum in engagement with said segment to be rotated thereby, the radius of said segment being so dimensioned in excess to the length of said arm carrying it that the distance of the axis of said drum from the axis of oscillation of said weigh-beam will remain unaffected by oscillations of said weigh-beam regardless of the turns of said eccentric caused thereby and that said eccentric will be turned by said segment through equal successive angles in response to successive equal increases of the weight imposed upon said plate support.

5. An automatic inclination balance comprising a weigh-beam mounted upon a support and adapted to swing about said support, a plate carried by one arm of said beams for holding the goods to be weighed, a counterweight suspended from said beam, a segment having a cam face attached to the other arm of the weigh-beam, a drum having a uniform peripheral scale mounted for rotation without substantially any to and fro horizontal motion, an axle for said drum, a cylindrical cam fixed eccentrically upon the axle of said drum and cooperatively associated with the cam face of the said segment for rotation thereby, the cam face of said segment having a radius of curvature greater than the distance between the axis of the drum and the axis about which said weigh-beam swings and the sum of said radius and the radius of the said eccentrically mounted cylindrical cam at any time remaining constant regardless of the amount of displacement of the weigh-beam whereby to and fro horizontal motion of the axle of the drum is substantially eliminated and whereby the drum is turned to equal successive angles in response to successive equal increases of weights deposited upon the aforesaid plate.

6. An automatic inclination balance comprising a weigh-beam mounted upon a support and adapted to swing about said support, a plate carried by one arm of said beams for holding the goods to be weighed, a counterweight suspended from said beam, a segment having a cam face attached to the other arm of the weigh-beam, said cam face having a radius of curvature greater than the distance between the axis of the drum and the axis about which the weigh beam swings, a drum having a uniform peripheral scale mounted for rotation without substantially any to and fro horizontal motion, an axle for said drums, a cam fixed upon the axle of said drum and cooperatively associated with the cam face of the said segment for rotation thereby, and having a profile such that the radii effective at any position to translate the shifting motion of the segments into rotating motion of the axle must continually increase from an initial position to an intermediary position and, then, decrease by the same amounts toward the end or terminal position whereby the drum is turned to equal successive angles in response to successive equal increases of weights deposited upon the aforesaid plate.

7. An automatic inclination balance of the type set forth in claim 5 in which the weigh-beam is operatively connected to the piston of a dash pot.

8. An automatic inclination balance of the type set forth in claim 3 in which the single supporting lever is balanced by a counterweight.

9. An automatic inclination balance comprising, in combination, a pendulum, a support for the goods to be weighed and a segment, the latter being pivotally mounted about a substantially horizontal axis, both said support and said segment being cooperatively connected to said pendulum for common displacement in response to the weight of said goods, a rotatable drum having an axle disposed in front of said segment and parallel to said axis, one single supporting lever provided with a rolling face supporting said axle, a cam fixed on said axle in engagement with the curved face of said segment to be rotated thereby, when said weigh-beam is displaced, and bands wound upon said cam and said segment to secure non-slipping engagement of the same and to keep said axle from tilting about its supporting lever.

In testimony whereof I have affixed my signature.

JOHANN FISCHER.